United States Patent
Prasad et al.

(10) Patent No.: US 10,402,803 B1
(45) Date of Patent: Sep. 3, 2019

(54) INITIATING A KIOSK TRANSACTION

(71) Applicant: United Services Automobile Association (USAA), San Antonio, TX (US)

(72) Inventors: Bharat Prasad, San Antonio, TX (US); Richard A. Davey, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/691,101

(22) Filed: Apr. 20, 2015

Related U.S. Application Data

(63) Continuation of application No. 13/627,874, filed on Sep. 26, 2012, now Pat. No. 9,010,627.

(60) Provisional application No. 61/539,825, filed on Sep. 27, 2011.

(51) Int. Cl.
   *G06Q 20/18* (2012.01)
   *G06Q 20/20* (2012.01)
   *G06Q 20/40* (2012.01)

(52) U.S. Cl.
   CPC .......... *G06Q 20/18* (2013.01); *G06Q 20/202* (2013.01); *G06Q 20/206* (2013.01); *G06Q 20/40* (2013.01)

(58) Field of Classification Search
   CPC .... G06Q 20/32; G06Q 20/40; G06Q 20/1085; G06Q 20/322; G06Q 20/327; G06Q 20/385; G07F 19/20; G07F 19/203
   USPC ........................................................ 235/379
   See application file for complete search history.

(56) References Cited

U.S. PATENT DOCUMENTS

| | | | |
|---|---|---|---|
| 6,095,414 A * | 8/2000 | Long | G06K 7/10861 235/383 |
| 6,796,490 B1 * | 9/2004 | Drummond | G06Q 20/32 235/379 |
| 7,419,097 B2 | 9/2008 | Lee et al. | |
| 7,611,048 B1 | 11/2009 | Warren et al. | |
| 7,686,213 B1 | 3/2010 | Ramachandran | |
| 7,861,922 B2 * | 1/2011 | Lee | G06Q 20/105 235/379 |
| 7,992,776 B1 | 8/2011 | Ramachandran et al. | |
| 2005/0102233 A1 * | 5/2005 | Park | G06Q 20/16 705/44 |

(Continued)

OTHER PUBLICATIONS

Petrlic, Ronald et al., "A Mutual Authentication Scheme for ATMs," Computer Science Department, University of Paderborn, 10 pgs.

*Primary Examiner* — Thien M Le
*Assistant Examiner* — Tae W Kim
(74) *Attorney, Agent, or Firm* — Perkins Coie LLP

(57) ABSTRACT

A method of initiating a banking transaction at a banking terminal is provided. The method includes optically capturing machine readable identification data of the banking terminal by a mobile device of a customer. A terminal identifier of the banking terminal is determined based on the machine readable identification data. Account information and the terminal identifier are transmitted from the mobile device for delivery to a server. The account information is associated with the customer and stored in the mobile device. The method also includes the step of transmitting the account information from the server to the banking terminal using the terminal identifier and receiving a customer transaction request from the customer at the banking terminal.

16 Claims, 8 Drawing Sheets

(56) References Cited

U.S. PATENT DOCUMENTS

| | | | |
|---|---|---|---|
| 2006/0016884 A1 | 1/2006 | Block et al. | |
| 2007/0005988 A1* | 1/2007 | Zhang | G06F 21/32 |
| | | | 713/186 |
| 2008/0059372 A1* | 3/2008 | Lee | G06Q 20/105 |
| | | | 705/41 |
| 2009/0265273 A1* | 10/2009 | Guntupalli | G06Q 20/18 |
| | | | 705/44 |
| 2009/0319360 A1 | 12/2009 | Salemi | |
| 2011/0093389 A1 | 4/2011 | Singhal | |
| 2011/0238573 A1 | 9/2011 | Varadarajan | |
| 2011/0241823 A1* | 10/2011 | Anders | H04W 12/02 |
| | | | 340/5.8 |
| 2012/0197798 A1* | 8/2012 | Grigg | G06Q 20/1085 |
| | | | 705/43 |
| 2012/0265809 A1 | 10/2012 | Hanson et al. | |

\* cited by examiner

INITIATING A KIOSK TRANSACTION

CROSS-REFERENCE TO RELATED APPLICATIONS

This application is a continuation of U.S. patent application Ser. No. 13/627,874, filed on Sep. 26, 2012, now Allowed, which claims the benefit of U.S. Provisional Application No. 61/539,825, filed on Sep. 27, 2011, both of which are hereby incorporated by reference for all purposes in their entireties.

TECHNICAL FIELD

Various embodiments of the present invention relate generally to kiosks used to perform financial transactions. More specifically, various embodiments of the present invention relate to using a mobile electronic device to capture machine readable information from a kiosk to initiate a transaction using the kiosk.

BACKGROUND

While electronic and online banking has increased in popularity, some banking transactions still cannot be completed exclusively through electronic exchange of data over a network. Some transactions involve exchange of tangible items. These transactions may involve cash deposits, cash withdrawals, check deposits, printed documents, documents requiring original signatures, or other tangible items. In these cases, a customer must complete the transaction at a location which facilitates the exchange of these tangible objects. In addition, some transactions may require the use of some type of biometric data, and, therefore, also cannot be completed exclusively over the Internet or through another electronic communication network.

It is costly for banks to establish staffed bank branches at locations which are convenient for all of their customers. Technology enables automatic teller machines (ATMs) and kiosks to perform some types of banking functions in a wider variety of locations which are more convenient for the customers. ATMs and kiosks are typically located in public or semi-public locations. Some customers have security and personal safety concerns with respect to performing banking transactions in these locations because the transactions often involve confidential or risky activities such as handling of cash, use of account cards, entry of personal identification numbers (PINs), entry of account information, and/or entry of other transaction data. As ATMs become more sophisticated, the types of transactions which can potentially be performed at them will also become more complex in many cases. These more complex transactions may require customers to perform more of these confidential or risky activities in these public or semi-public locations. The electronic nature of the transactions also raises concerns about fraudulent transactions, hijacked transactions, falsified transactions, or other misuse of a customer's personal and/or account information.

SUMMARY

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

In one embodiment, a method of initiating a banking transaction at a banking terminal is provided. The method includes optically capturing machine readable identification data of the banking terminal by a mobile device of a customer. A terminal identifier of the banking terminal is determined based on the machine readable identification data. Account information associated with the customer and the terminal identifier are transmitted from the mobile device for delivery to a server. The method also includes the step of transmitting the account information from the server to the banking terminal using the terminal identifier and receiving a customer transaction request from the customer at the banking terminal. Finally a banking transaction is performed based on the account information and the customer transaction request.

In some embodiments, performing the banking transaction includes receiving the customer transaction request at the server, transmitting transaction instructions from the server at the banking terminal, where the transaction instructions are performed at the banking terminal.

In some embodiments, the customer transaction request does not include an account number or a password.

In some embodiments, performing the banking transaction includes: processing the customer transaction request at the banking terminal, transmitting a transaction authorization request from the banking terminal to a host processor based on the customer transaction request, receiving a transaction authorization at the banking terminal from the host processor, and, in response to receiving the transaction authorization, performing transaction instructions at the banking terminal based on the customer transaction request and the account information.

In some embodiments, the banking terminal comprises the server.

In some embodiments, the banking transaction comprises at least one of the group of: a cash withdrawal, a balance inquiry, a bill payment, and a deposit.

In some embodiments, the machine readable identification data comprises a bar code. In a further variation of this embodiment, the bar code comprises a Quick Response (QR) code.

In some embodiments, the method includes a password entered into the mobile device by the customer is validated prior to transmitting the account information and the terminal identifier from the mobile device to the server.

In some embodiments, a system for initiating a banking transaction at a banking terminal is provided. In some embodiments the system includes one or more processors and computer-readable code that programs the one or more processors to receive account information and a terminal identifier of a banking terminal from a mobile device of a customer, where the terminal identifier is determined based on machine readable identification data, the machine readable identification data is optically captured by the mobile device, where the account information is associated with the customer and stored in the mobile device; and transmit the account information to the banking terminal using the terminal identifier. In some embodiments, a customer transaction request is received from the customer at the banking terminal, and a banking transaction is performed at the banking terminal based on the account information and the customer transaction request.

In some embodiments, the customer transaction request does not include an account number or a password.

In some embodiments, the code that programs the processor to initiate a banking transaction at a banking terminal further programs the one or more processors to receive the customer transaction request from the automated banking terminal; generate transaction instructions based on the customer transaction request and the account information; and transmit transaction instructions to the banking terminal. In some embodiments, the banking instructions are performed at the banking terminal.

In some embodiments, the customer transaction request is processed at the banking terminal, a transaction authorization request is transmitted from the banking terminal to a host processor based on the customer transaction request, a transaction authorization is received at the banking terminal from the host processor, and transaction instructions are performed at the banking terminal based on the customer transaction request and the account information in response to receiving the transaction authorization.

In some embodiments, a password entered into the mobile device by the customer is validated prior to transmitting the account information and the terminal identifier from the mobile device.

In some embodiments, an electronic receipt is transmitted from the banking terminal to the mobile device.

In some embodiments, a computer readable medium is provided. The computer readable medium comprises non-transitory computer readable instructions which, when executed by one or more processors, facilitate initiation of a financial transaction at a banking terminal.

In some embodiments, a device for assisting with performance of a banking transaction at a banking terminal is provided.

BRIEF DESCRIPTION OF THE DRAWINGS

Embodiments of the present invention will be described and explained through the use of the accompanying drawings described below.

Figure 1:
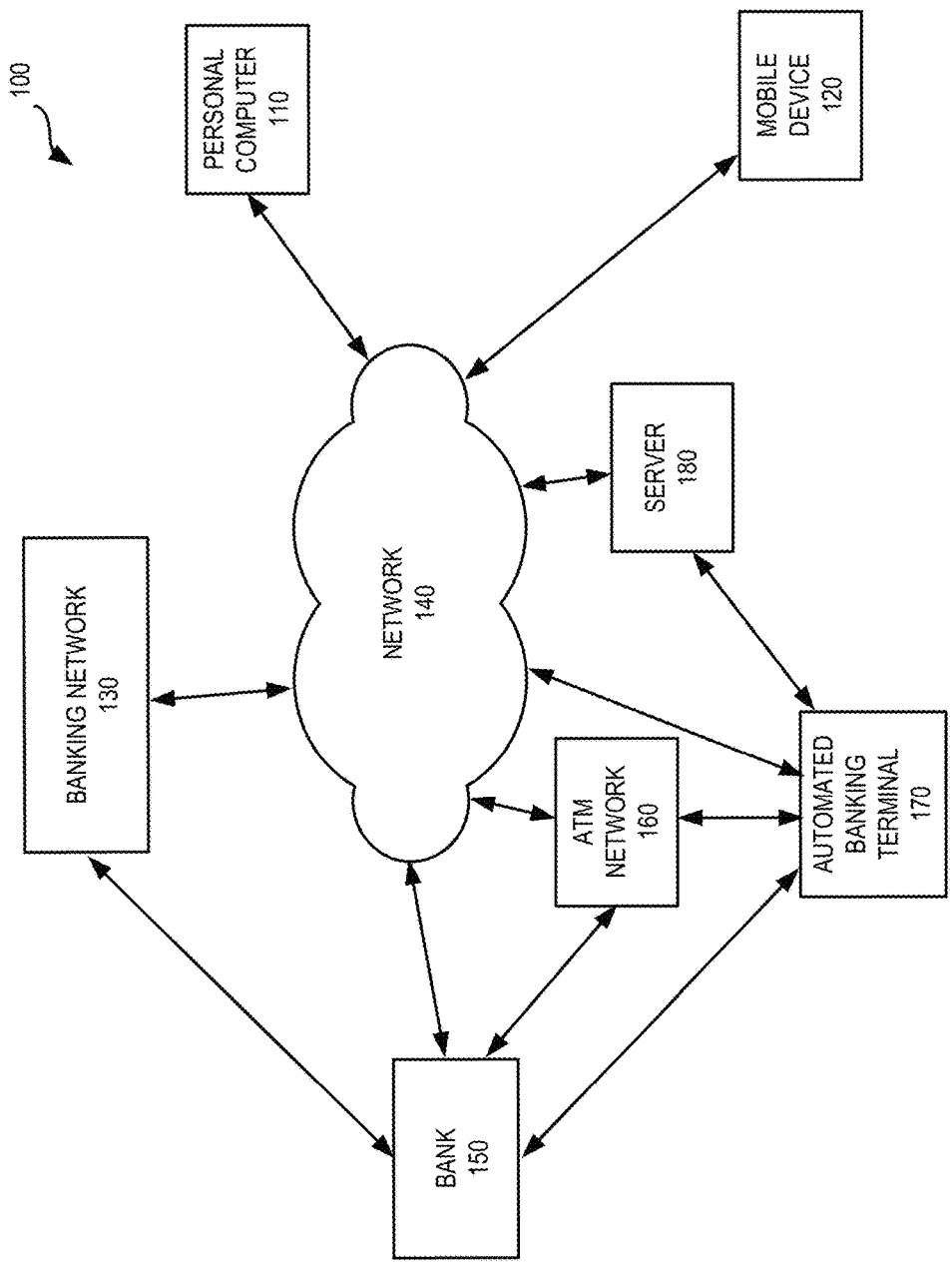
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention relate generally to kiosks used to initiate financial transactions. More specifically, various embodiments of the present invention relate to using a mobile electronic device to capture machine readable information from the kiosk to initiate a transaction using the kiosk. The terms 'kiosk' and 'banking terminal' may be used interchangeably throughout the description and no distinction is intended.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

As financial institutions strive to provide more convenient banking options for their customers, the use of automated banking terminals and kiosks will increase. At the same time, there is increased usage of personal computers and personal mobile computing devices. Many banking transactions can be performed using a personal computer or mobile communication device which has an Internet or other network connection. However, some transactions still require customers to interact with a banking terminal or kiosk because these transactions require exchange of one or more tangible objects. These transactions include: cash withdrawals, cash deposits, check deposits, and issuing of credit/debit/ATM/prepaid cards. These transactions may also include transactions which require an original signature or exchange of physical documents. Other transactions which require this type of interaction are also possible.

Because kiosks are often in public or semi-public places, customers are often concerned about the amount of personal, account, or confidential information they must enter at the kiosk. When this information is entered at a kiosk, there is a risk that the information is seen, stolen, copied, or otherwise exposed to other parties. This could occur due to others standing in the vicinity, through one or more cameras recording the actions of the customer, or through some other type of device which captures the entries, movements, or data of the customer. In addition, customers may not be able to focus their full attention on the handling of cash and checks in these locations because they must also place attention on other activities including locating an account card, swiping the account card, entering a PIN, and responding to various other inquiries from the kiosk. Furthermore, the electronic nature of these transactions also raises concerns about fraudulent transactions, hijacked transactions, falsified transactions, or other misuses of a customer's personal and/or account information.

Therefore, in some cases it will be beneficial to reduce the amount of information which a customer must enter through a kiosk keypad, touchscreen, or other entry device. It is also desirable to maintain, or even improve, the authentication process for validating the customer's credentials for performing the transaction. The process is improved if a customer is able to initiate a transaction at a banking terminal by entering little, if any, personal, confidential, or account information directly into the kiosk. It is also desirable to make use of existing banking software or authentication tools which may exist on the customer's mobile communication device. Finally, it may also be desirable to verify that a transaction which is purportedly happening at a particular kiosk is in fact being performed by a person at or near that kiosk. Various embodiments of the present invention provide features which accomplish one or more these objectives.

Although many of the embodiments are described with reference to initiating a banking transaction at a kiosk or electronic banking terminal, the descriptions and illustrated embodiments of the present invention are not meant to be limiting, but instead examples. The invention may apply to many other types of interactions with electronic terminals which require some type of authentication or verification. The invention is intended to cover all modifications, equivalents, and alternatives falling within the scope of the invention as defined by the appended claims.

Having described embodiments of the invention generally, attention is now directed to FIG. 1 which illustrates an example of operating environment 100 in which some embodiments of the present invention may be utilized. Embodiments of the present invention implemented in operating environment 100 enable banking terminal transactions to be initiated and performed in a number of different ways. Operating environment 100 comprises personal computer 110, mobile device 120, banking network 130, network 140, bank 150, ATM network 160, automated banking terminal 170, and server 180.

Personal computer 110 may be any type of computing device which a customer uses to access or exchange information with a network or with another computing device. Personal computer 110 may be a computer, server, gaming console, set top box, Internet kiosk, network access terminal, or network access device of another type. Mobile device 120 may be any type of transportable computing device which a customer can use to access or exchange information with a network or with another computing device. Mobile device 120 may be a phone, smartphone, personal digital assistant (PDA), tablet computer, netbook, or transportable computer. Mobile device 120 may also be one example of personal computer 110. Mobile device 120 will also have a built in camera or other type of optical scanning device. Personal computer 110 and mobile device 120 may connect to network 140 directly or through other connections or devices including routers, hubs, Wi-Fi connections, cellular towers, cellular networks, base stations, modems, or other devices. Personal computer 110 and mobile device 120 may also contain banking software which enables a user to perform banking transactions with or through bank 150.

Banking network 130 may include any number of membership organizations, banks, credit unions, or financial institutions. In accordance with embodiments of the present invention, banking network 130 can use a variety of interaction methods, protocols, and systems. For example, banking network 130 may use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

Bank 150 may be a bank or other type of financial services institution including an insurance company, a credit union, a brokerage company, a mortgage company, an investment services company, or a combination thereof. ATM network 160 may be any set of ATMs in an interbank ATM network and/or intrabank ATM network.

Automated banking terminal 170 may be any type of interface which customers use to perform automated financial transactions with bank 150 or another financial institution. Automated banking terminal 170 may be a standalone ATM or may be a set of automated banking functionality embedded in another computing device or system. In some cases, automated banking terminal 170 may comprise software which includes computer readable instructions which, when executed by a processor, direct the processor to perform the functions of an automated banking terminal. In some cases, this software may be installed and operate on personal computer 110, mobile device 120, another computing device, or may be split across multiple devices. Automated banking terminal 170 may interface with ATM network 160, bank 150, banking network 130, other devices, or any combination thereof.

Server 180 may be any type of computing device used to access, process, store, or transmit electronic information. In some embodiments server 180 may be a computer, router, storage device, database, or a network attached computing device of another type.

As illustrated in FIG. 1, mobile device 120, automated banking terminal 170, ATM network 160, bank 150, and banking network 130 may interact with each other in a variety of ways including directly or through network 140, another network, or a combination of networks. Using these elements, financial transactions may be performed in a number of ways or at a number of different locations. The transactions may also involve other banks accessible through banking network 130, other ATMs accessible through ATM network 160, or other devices or entities accessible through network 140. Bank 150 may be the owning/operating bank of automated banking terminal 170 or the terminal may be owned or operated by another entity.

In this example, automated banking terminal 170 may communicate directly with bank 150. Alternately, automated banking terminal 170 may communicate with bank 150 through any of a variety of combinations of ATM network 160, network 140, server 180, banking network 130, and/or other networks. If automated banking terminal 170 is not owned and/or operated by bank 150, automated banking terminal 170 may still communicate with bank 150 in order to perform a transaction if bank 150 is associated with one or more accounts involved in the transaction. In this case, automated banking terminal 170 may communicate with bank 150 through one or more of the paths described. The financial transactions described herein may be performed using the elements of FIG. 1 in a number of different manners, combinations, or configurations.

Figure 2:
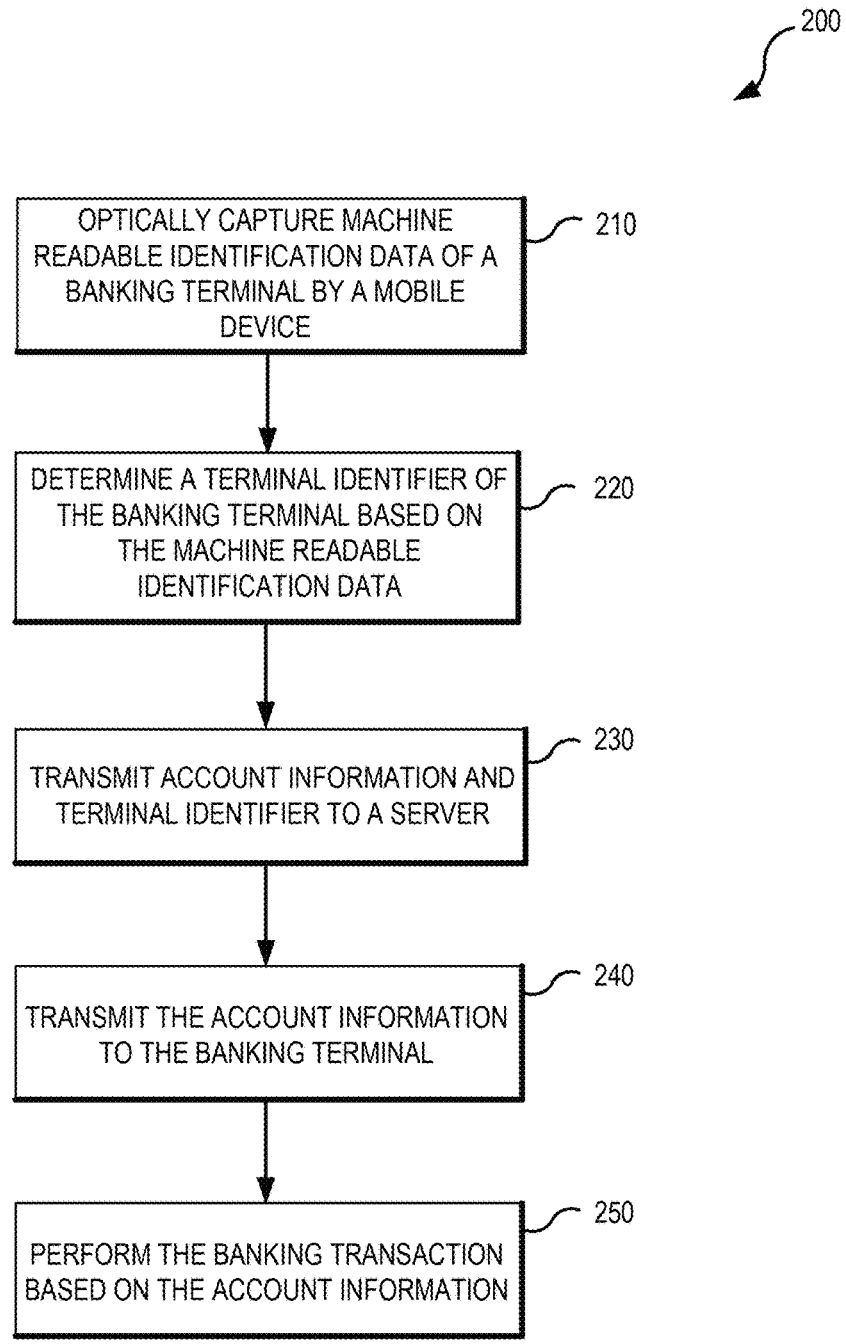
FIG. 2 illustrates a flow chart of operations for initiating a banking transaction at a banking terminal.

FIG. 2 illustrates a set of steps for initiating a banking transaction at a banking terminal. The steps include optically capturing machine readable identification data of a banking terminal by a mobile device of a customer (step 210). The steps further include determining a terminal identifier of the banking terminal based on the machine readable identification data (step 220) and transmitting account information and the terminal identifier from the mobile device for delivery to a server (step 230). Account information is not limited to an account number. Rather, account information may include an account number(s), and/or contextual information such as customer-related information and the session information of the established session on the mobile device being transferred to the banking terminal, for example. Account information may further include the transaction information such as deposit/withdraw cash, deposit check, print automobile insurance card, etc. The transaction information may be transmitted after most of the transaction is completed on the mobile device 120 or other user device prior to the customer reaching the kiosk. The customer may use the peripheral of the banking terminal, such as the cash/check acceptor, printers, etc. to complete the transaction. The steps further include transmitting the account information from the server to the banking terminal using the terminal identifier (step 240) and performing the banking transaction based on the account information and the customer transaction request (step 250).

Figure 3:
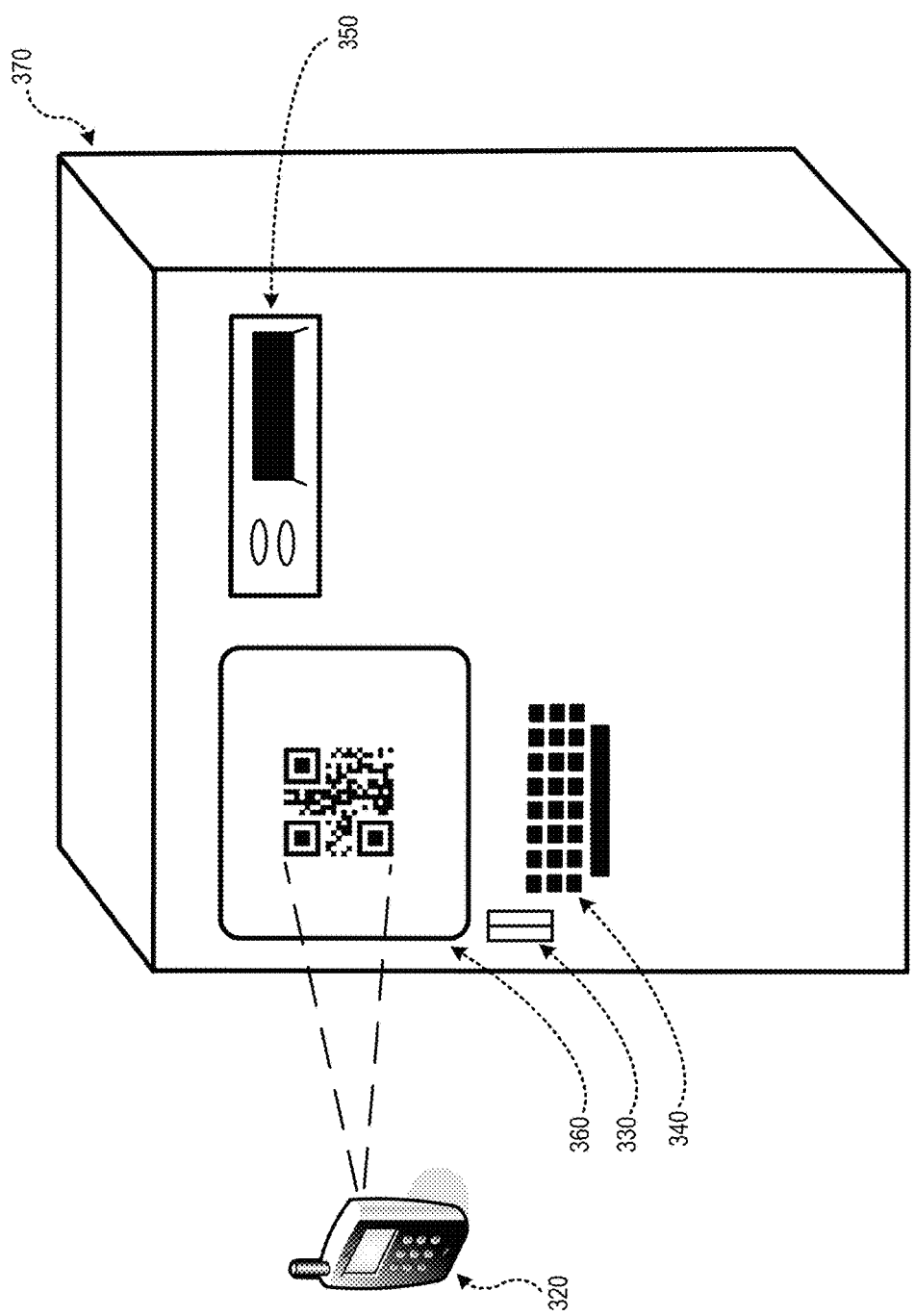
FIG. 3 illustrates an example of a banking terminal.

FIG. 3 illustrates an interaction between automated banking terminal 370 and mobile device 320 in one embodiment of the invention. Automated banking terminal 370 is an example of automated banking terminal 170 although other configurations and operations are possible. Mobile device 320 is an example of mobile device 120 although other configurations and operations are possible. Automated banking terminal 370 comprises display 360, card reader 330, user interface 340, and cash module 350.

Display 360 may be any type of device for visually displaying information to a customer. Display 360 may be a liquid crystal display (LCD), cathode ray tube (CRT), light emitting diode (LED) display, touchscreen, electronic paper (e-paper) display, or a display on a separate computing device.

Card reader 330 comprises any type of device for reading information from an account card. Card reader 330 could be configured to read magnetic strips, memory cards, SIM cards, or read electronic information through other means including through wired or wireless connections. Alternatively, a different device could be used to interface with mobile device 320. In some embodiments, card reader 330 may not be needed on automated banking terminal 370 due to the improvements provided by this disclosure.

User interface 340 comprises any type of device for receiving customer input and could comprise a keyboard, mouse, touchscreen, keypad, button array, or input device of another type. The user interface may be ADA-compliant. For example, the user interface 340 may be voice driven, with the ability to receive responses via pin pad or a voice from the customer. User interface 340 may also be implemented on mobile device 320. Cash module 350 is an operational module of banking terminal 370 which dispenses cash withdrawals, receives cash deposits, or both. Many other modules or features which perform other functions, in addition to or in place of cash module 350, are possible.

In one example, a customer uses mobile device 320 to initiate a transaction at banking terminal 370 in operating environment 100. In this example, the transaction is a cash deposit transaction. When the customer approaches automated banking terminal 370 to begin the transaction, the customer does not swipe an account card in card reader 330 or enter a password or other account information through user interface 340 as is done traditionally. Instead, the customer optically captures machine readable information displayed on display 360 using mobile device 320. The machine readable information may be displayed in response to some type of input by the user. In this example, the machine readable information is a Quick Response (QR) code. A QR code is a type of two dimensional barcode typically configured to be read by smartphones and other mobile electronic devices. The machine readable information may also be another type of barcode or information which is in another format capable of being optically captured and/or processed. In one variation, the machine readable information is not displayed on display 360 but is displayed elsewhere on banking terminal 370 or in the general vicinity.

The QR code contains information identifying automated banking terminal 370 which will be used by mobile device 320 to initiate a transaction. The QR code may also include other types of information including a date, a time, a window of time for which the code is valid, an address, a geographic location, a server identification, a bank identifier, an IP address, a transaction processing network, a URL, or other information. The QR code may be captured by mobile device 320 using a camera, bar code scanner, or other type of optical capture device. Mobile device 320 processes the QR code to extract one or more pieces of this information from the QR code. This information is primarily used to identify automated banking terminal 370 but could include other information for additional purposes.

Using the information extracted from the QR code, mobile device 320 transmits a message indicating the customer's desire to begin a transaction on automated banking terminal 370 to an entity or device which will initiate the transaction on banking terminal 370. The message may also include information identifying the customer and/or the customer's account for the transaction. The information may also include other types of data verifying the identity of the user or authorizing the transaction. Mobile device 320 transmits this information over a wireless connection. The information is transmitted to an entity or device which is identified or referenced in the QR code. The entity or device may be bank 150, banking network 130, ATM network 160, server 180, or another entity. In some embodiments, the QR code is transmitted to server 180 for processing and extraction of additional information. The information may be transmitted through a cellular network, a base station, a Wi-Fi connection, a Bluetooth connection, the Internet, network 140, or any combination thereof.

For purposes of this example, the QR code identifies bank 150 as the controlling entity and bank 150 is the recipient of the information. Bank 150 receives the communication from mobile device 320 and processes the customer information, account information, password, token, or other information necessary for verification of the user and/or the account. Bank 150 then compiles information necessary to initiate the transaction and transmits this information for delivery to automated banking terminal 370. Bank 150 is able to determine which automated banking terminal should receive the information based on data extracted from the QR code. Automated banking terminal 370 receives this information and initiates or stages the transaction. At this point, the user is able to begin entering additional transaction information, if any, to complete the transaction. This additional transaction information may include an amount of a cash deposit or other information. The customer is then able to complete the transaction at automated banking terminal 370 in a traditional manner. In some embodiments, the transaction can be initiated on the mobile device and continued to completion on the banking terminal. Alternatively, the authentication of the customer and identification of the banking terminal occurs via the mobile device and the transaction is initiated on the banking terminal.

As described above, the customer is able to complete the transaction without swiping an account card and without directly entering an account number, a PIN, a password, or other identifying information directly into automated banking terminal 370. Information which identifies the customer and/or the account is transmitted to automated banking terminal 370 by bank 150 through one or more networks based on the information extracted from the QR code. As described previously, server 180, ATM network 160, or banking network 130 may also be involved in the exchange of information.

In another embodiment, mobile device 320 may include software which is used in the authorization of the user or the account. This software may require the user to enter a password or PIN to authenticate the user. This makes it difficult for another in possession of mobile device 320 to perform a transaction using the device. The PIN or password may be validated within the software contained in mobile device 320 or it may be forwarded along with the information from the QR code to be validated elsewhere. In this example, two factor security may be satisfied even though an account card is not used because the customer is required to have mobile device 320 with the proper software installed as well as know the correct password to enter into an interface of the software.

The software in mobile device 320 which performs the authentication function described above may be software dedicated to this function or may be one feature of an online banking software application. This online banking application may also facilitate online banking transactions with bank 150 for which use of a banking terminal or kiosk is not needed. For example, the banking application may be the same software application which is used by mobile device 320 or personal computer 110 to connect with bank 150 for checking balances, transferring money, or making online bill payments. The processes the software uses to authenticate the user for the kiosk interactions described herein may be the same or similar processes the software uses to verify the user for these other online banking purposes. The communication between mobile device 320 and bank 150, or any other entity, may occur over an authenticated, verified, or otherwise secured communication session. The software application may or may not control the camera or other optical device which captures the QR code and may or may not control the processing of the resulting optical information.

In another variation, automated banking terminal 370 transmits an electronic receipt for the transaction to mobile device 320 in place of, or in addition to, providing a traditional paper receipt. The electronic receipt may be an email message, a text message, or an electronic message of some other format.

In another variation, the QR code may contain additional information. This additional information may include a limited time window in which the QR code is valid. In this case, the QR code will change periodically. An attempt to initiate a transaction using a QR code which is expired or outdated will not be approved. The QR code may also have additional dynamic keys, codes, or sequences integrated into the QR code making it difficult to artificially generate a valid QR code. Many types of security key methodologies and rolling codes are known in the art. The QR code may also have encrypted data. The decoding of the data may take place at the mobile device or the bank after capture. This allows protection of the code from being deciphered by publicly used QR readers.

In another variation, the location of the user is verified before initiating the transaction. As described previously, the QR code contains information about the location of the automated banking terminal or information which can be used to look up the location of the automated banking terminal. Most cellular networks are capable of determining an approximate location of a mobile device using one or more of various methods. In addition, many mobile devices are capable of determining their own location using Global Positioning Satellite (GPS) methods. In some examples, the banking terminal may be GPS-enabled as well, adding an additional step for proximity identification.

In this variation, information about the location of the banking terminal is determined based on information in the QR code and compared to the location of the mobile device as reported by the mobile device or the cellular network. The locations may be compared to determine if they are the same or are similar within a specified range. This comparison may be performed to verify that the mobile device which is purportedly being used to initiate the transaction is actually at or near the banking terminal specified in the QR code. If not, the transaction request could be false, fraudulent, erroneous, or otherwise invalid. This additional step is another layer of security which is used to validate the request before enabling the automated banking terminal to initiate the transaction. This additional verification step is beneficial because the user may not be required to enter a password, PIN, or account number into the automated banking terminal and may not have even physically interacted with the automated banking terminal up to this point in the transaction.

In another variation, the customer also enters information about the desired transaction into the mobile device. In this example, the transaction information is transmitted along with the information from the QR code to the bank or other entity managing the transaction. This information is transmitted to the automated banking terminal thereby further minimizing the amount of information the user has to enter into the automated banking terminal. In the cash deposit example, the user may enter into the mobile device that the desired transaction is a cash deposit and may also even enter the deposit amount. In this way, the user would not have to enter this information into the user interface of the automated banking terminal. The user's interaction with the automated banking terminal could be limited to taking a picture of the QR code and physically inserting the cash into the cash receptacle. This approach minimizes the amount of information the user must enter into the automated banking terminal, possibly in view of others. It also allows the user to be focused on a smaller number of steps while standing at the terminal. Finally, it also potentially minimizes the complexity of the user interface required on the automated banking terminal if all transactions are completed in this manner.

Figure 4:
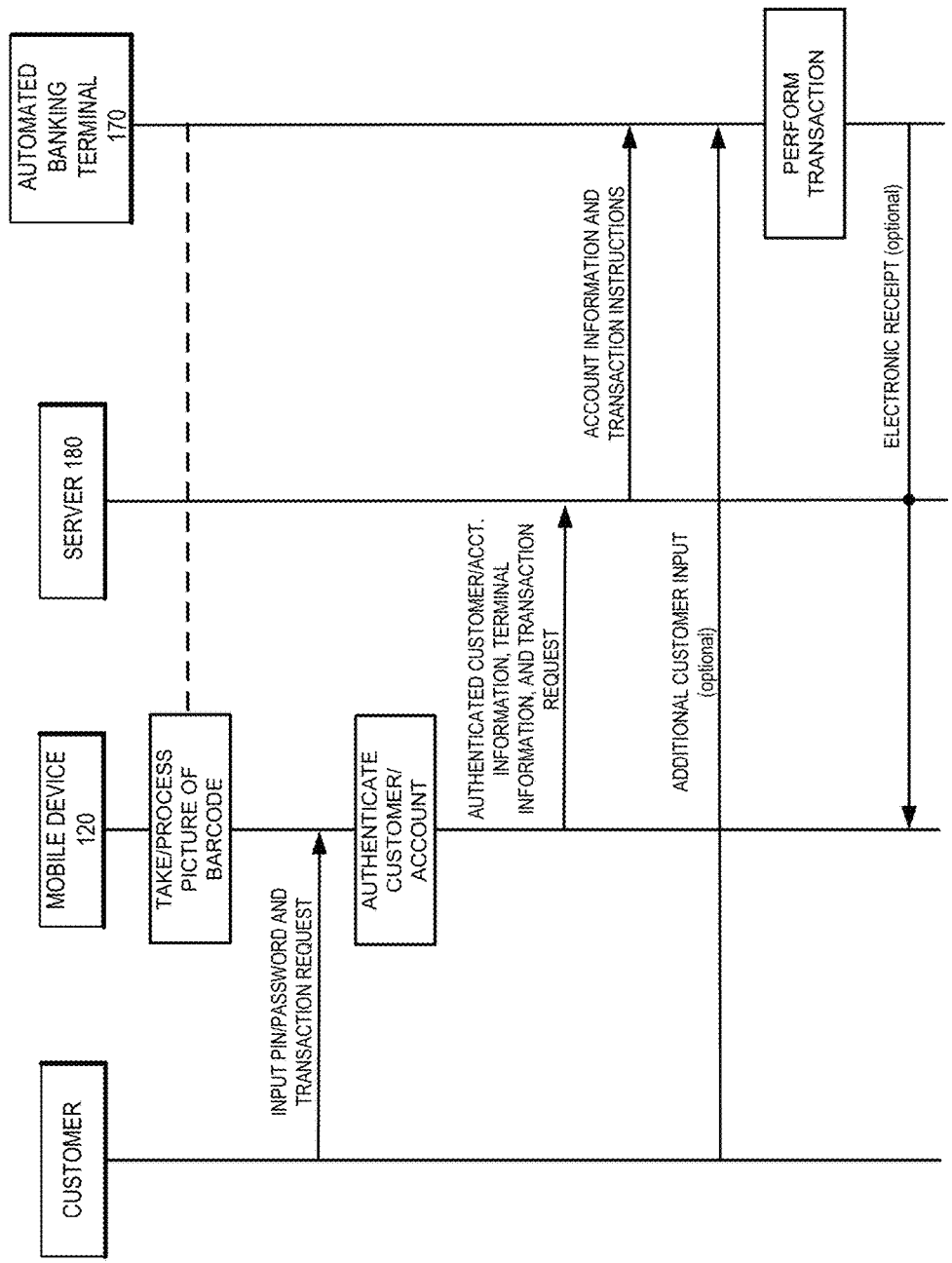
FIG. 4 illustrates an example of initiating a transaction at an automated banking terminal.

FIG. 4 illustrates an example of steps involved in initiating a transaction at an automated banking terminal. In the example of FIG. 4, a customer takes a picture of a barcode displayed by automated banking terminal 170 using mobile device 120. The barcode may already be displayed when the customer approaches automated banking terminal 170 or the customer may have to provide some input in order to trigger display of the barcode. The picture is processed to extract information which, at least, identifies automated banking terminal 170. In a variation of the embodiment described in FIG. 4, the taking of the picture and the processing of the QR code may be done after the customer and account authentication step, thereby allowing authentication to be the first operation performed before allowing a transaction. The identification may include a unit number, a network address, a physical address, an IP address, geographical coordinates, a URL, or other identifying information, including combinations thereof.

The customer also inputs a PIN, password, biometric data, or some other type of account access information into mobile device 120. This information is processed to authenticate the customer and/or the customer's access to the account. Software on mobile device 120 which performs this authentication may or may not be the same software which is utilized to perform other types of electronic banking activities. The customer may also enter information or instructions about the desired transaction. In one example, the customer may provide input or make a selection in the software indicating a desire to deposit checks.

Mobile device 120 transfers information regarding the requested transaction to server 180. This information may include the authenticated identification of the customer, account information, information identifying the automated banking terminal from the barcode, and information about the requested transaction. Typically the information is not transferred directly from mobile device 120 to server 180. In many cases, the information will be transferred through a number of links, connections, servers, or routers before reaching server 180. In one example, mobile device 120 transfers the information to a cellular tower in a cellular data network and the information is eventually transferred to server 180 over the Internet. In other examples, mobile device 120 may transfer the information over a Wi-Fi or Bluetooth connection. Many other configurations, links, or paths between mobile device 120 and server 180 are possible.

Continuing with FIG. 4, server 180 receives the information and identifies automated banking terminal 170 based on the received information. Server 180 then forwards the account information and transaction instructions to automated banking terminal 170. This communication may occur through a direct connection, the Internet, ATM network 160, or some other network. Server 180 may verify the information and authorize the transaction prior to sending the information or may leave these steps to automated banking terminal 170. Alternately, server 180 may be in communication with other systems to perform one or more of these verification or authorization steps.

At this point, automated banking terminal 170 may have sufficient information to perform a transaction even though the customer has potentially not directly entered any information into the terminal. Optionally, automated banking terminal 170 may also receive additional input from the customer about the transaction. For instance, the customer may provide an input indicating the number of checks which will be deposited. However, the most sensitive customer information (such as a PIN, password, or account number) will have already been received by automated banking terminal 170 through mobile device 120 and server 180. Automated banking terminal 170 performs the transaction and, optionally, transmits an electronic receipt to mobile device 120. The electronic receipt may be transmitted directly to mobile device 120, through server 180, or through one or more other devices. The electronic receipt may be transmitted in the form of an email message, a short message service (SMS) message, a text message, or in some other form.

Figure 5:
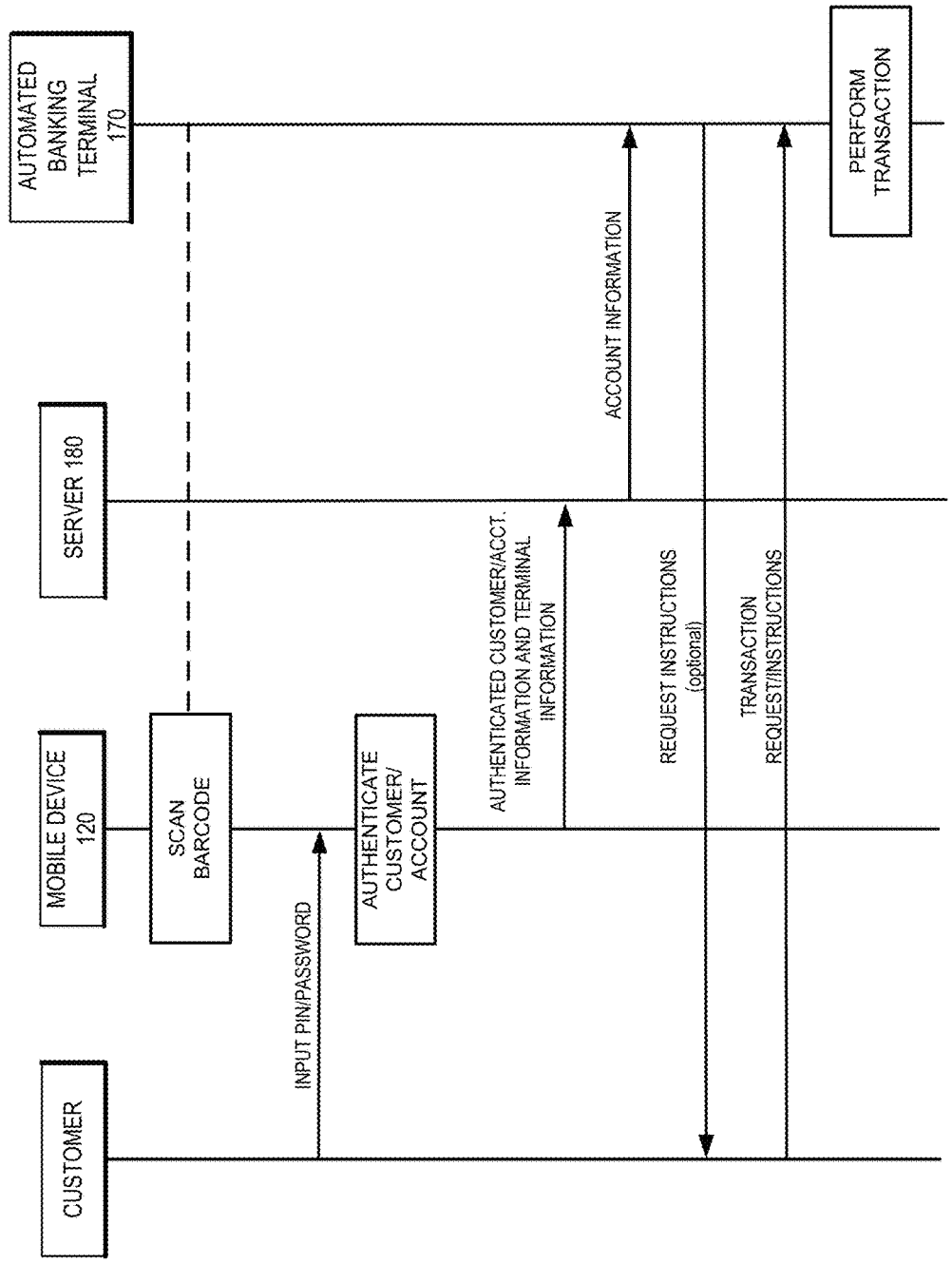
FIG. 5 illustrates an example of initiating a transaction at an automated banking terminal.

FIG. 5 illustrates an example of steps involved in initiating a transaction at an automated banking terminal. FIG. 5 is a variation of the example of FIG. 4. FIG. 5 is described primarily with respect to the differences from FIG. 4. However, all of the variations and optional features discussed with respect to FIG. 4 are also applicable to FIG. 5.

In the example of FIG. 5, a barcode is scanned from automated banking terminal 170 using mobile device 120. This barcode may be scanned by a barcode scanner of some type rather than a camera. In addition, the customer input to mobile device 120 does not include information about the desired transaction. Once automated banking terminal 170 receives the authenticated account information, it receives information about the transaction through direct input from the customer. The customer may already be inputting this information into automated banking terminal 170 as the other processes are taking place or automated banking terminal 170 may optionally request the information from the customer at the appropriate time. In either case, the customer is not entering the most sensitive or confidential of the transaction information into the user interface of automated banking terminal 170 where it may be visible or otherwise available to others. In some embodiments, scanning the barcode is done after the customer and account authentication step, thereby allowing authentication to be the first operation performed before allowing a transaction.

Figure 6:
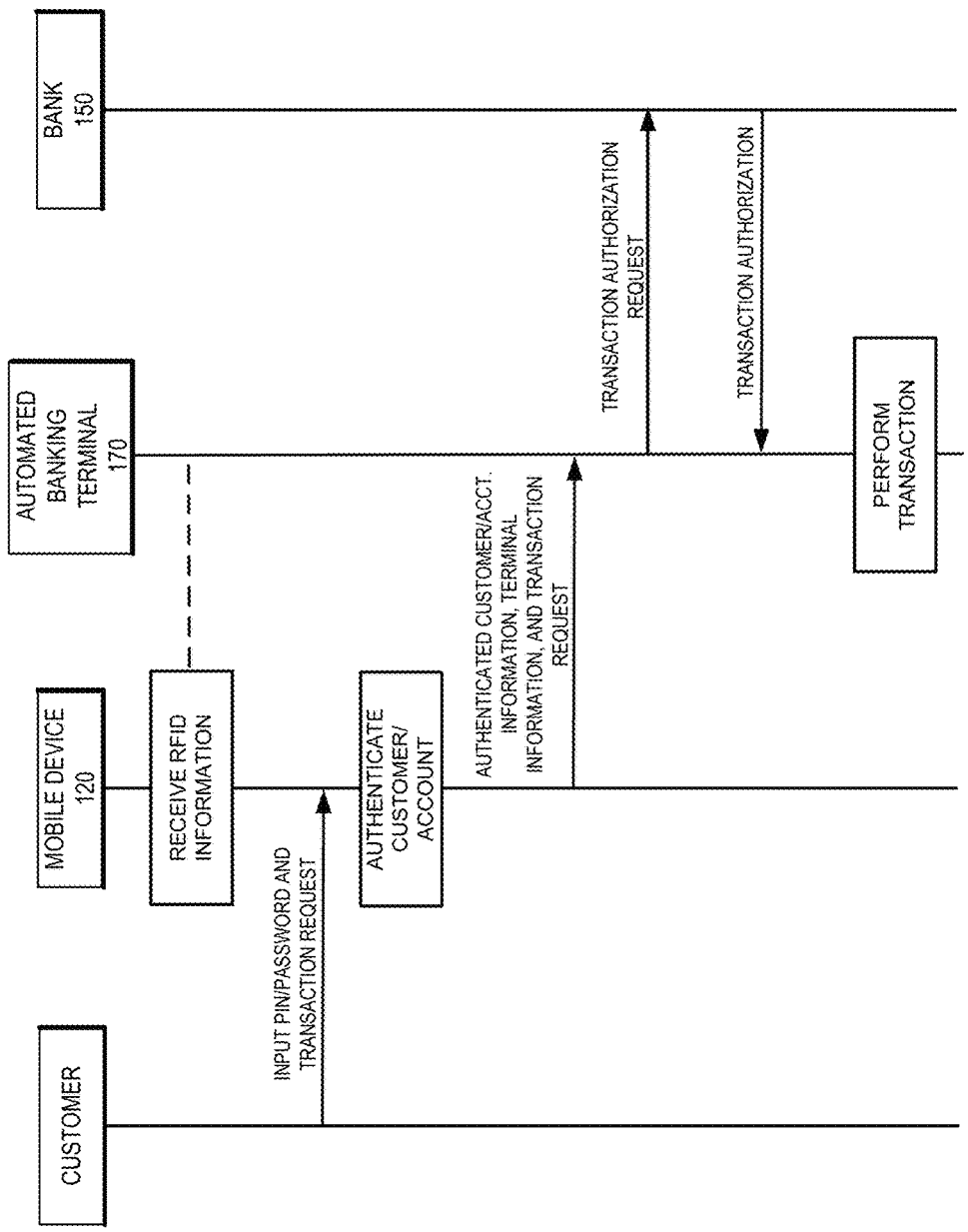
FIG. 6 illustrates an example of initiating a transaction at an automated banking terminal.

FIG. 6 illustrates an example of steps involved in initiating a transaction at an automated banking terminal. FIG. 6 is a variation of the examples of FIGS. 4 and 5. FIG. 6 is described primarily with respect to the differences from FIGS. 4 and 5. However, all of the variations and optional features discussed with respect to FIGS. 4 and 5 are also applicable to FIG. 6.

In the example of FIG. 6, mobile device 120 captures information about automated banking terminal 170 through receipt of radio frequency identification (RFID) information provided by the automated banking terminal. RFID information is transferred through radio waves and is not presented or captured optically. It should be understood that this embodiment includes any electronic transmission of information from automated banking terminal 170 to mobile device 120 and is not limited to a format or protocol typically used in RFID applications. Account or transaction information is transferred directly from mobile device 120 to automated banking terminal 170. This may occur through a wired connection or a wireless connection. A similar result may also be achieved if server 180 of FIG. 4 is contained within automated banking terminal 170. In either case, the transaction has not yet been authorized when the information arrives at automated banking terminal 170. Therefore, automated banking terminal 170 sends a transaction authorization request to bank 150 and performs the transaction when a transaction authorization message is received. The transaction authorization process may also involve ATM network 160 or banking network 130 or use one of many known methods in the field of transaction authorization. In some examples, a transaction host processor may perform some or all of the authorization process. In some embodiments, receiving RFID information is done after the customer and account authentication step, thereby allowing authentication to be the first operation performed before allowing a transaction.

Figure 7:
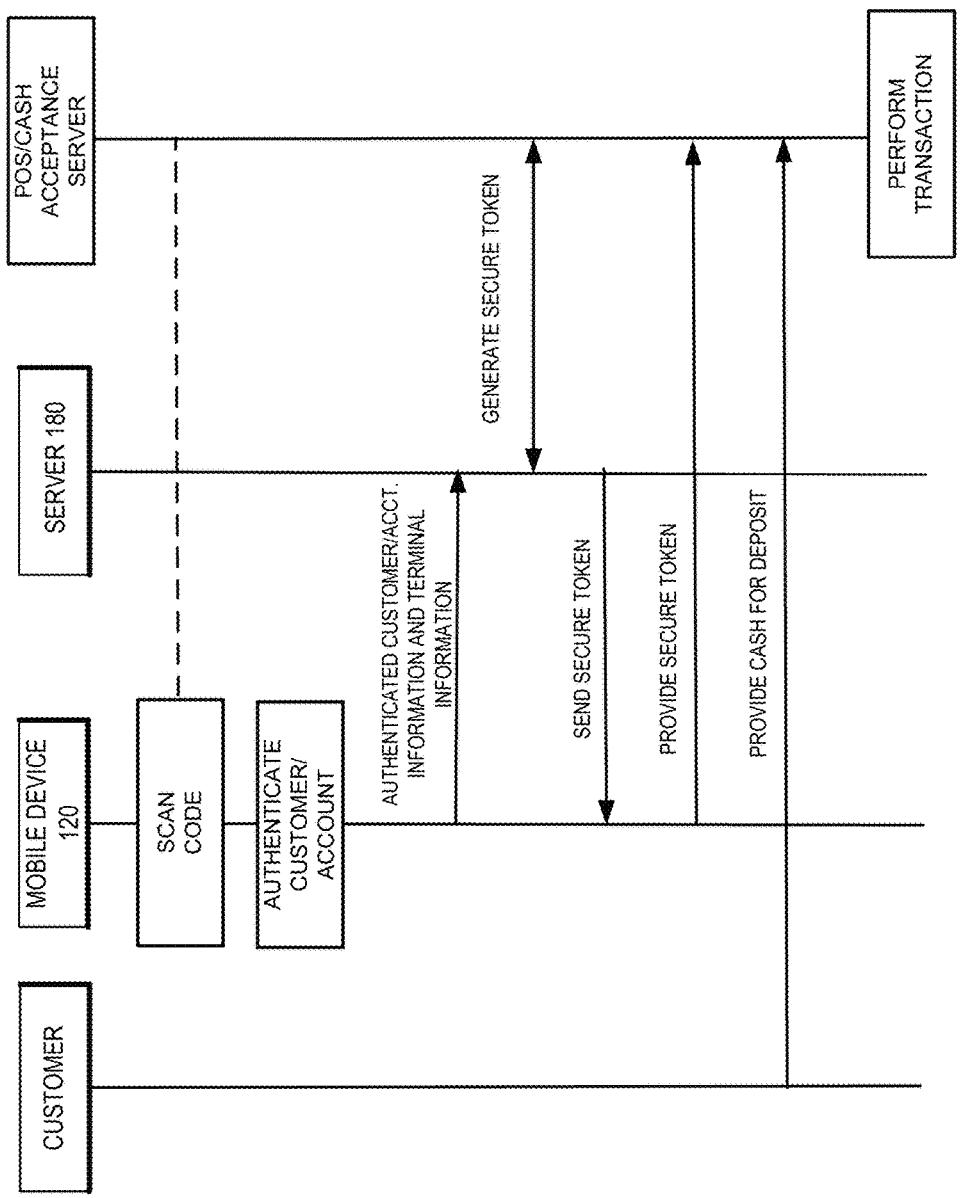
FIG. 7 illustrates an example of initiating a transaction at a point of sale.

FIG. 7 illustrates an example of initiating a transaction at a point of sale. FIG. 7 is a variation of the previous examples. However, all of the variations and optional features discussed with respect to the previous examples are also applicable to FIG. 7.

In the example of FIG. 7, the previously-described code authentication mechanism is used by a cash acceptance agency, such as Moneygram. A code, such as a QR code or a numeric code as described above, is displayed or made available to a customer near a clerk or other agent stationed at a POS/cash terminal in a store. The code may be a static code such as a code on a sticker, or the code may be dynamically initiated upon a request such as touching a button to perform a transaction. Next, the customer uses a financial application on the mobile device 120 to authenticate and capture the QR code as described above. The code is sent to server 180, which may be a server associated with a financial institution. Server 180 interacts with the cash acceptance agency servers to generate a secure numeric token. The token is sent to the customer's mobile phone 120 or other device associated with the customer. The customer provides the token to the agent or clerk. The agent or clerk then inputs the token into the POS, such as by keying in the token, into the POS/cash terminal. The customer provides the cash to the clerk or agent for deposit or transfer. In some embodiments, the customer interfaces with the POS directly and the agent or clerk is not included. The method described with respect to FIG. 7 is not limited to cash deposits, and the method may be used to execute other financial transactions.

Figure 8:
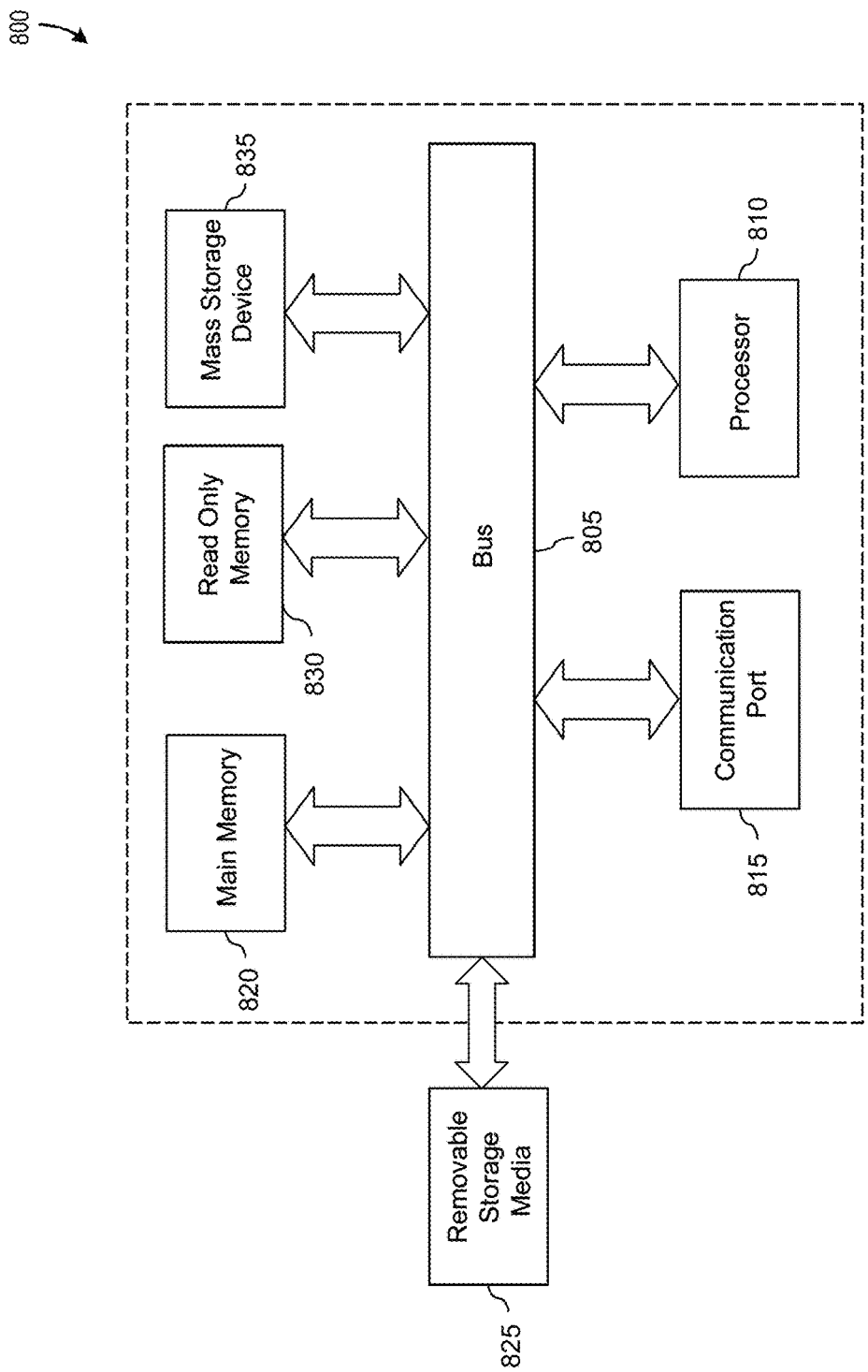
FIG. 8 illustrates an example of a computer system with which some embodiments of the present invention may be utilized.

Embodiments of the present invention include various steps and operations, which have been described above. A variety of these steps and operations may be performed by hardware components or may be embodied in instructions which are machine-executable and machine-readable. These instructions may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present invention may be utilized. According to the present example, the computer system includes a bus 805, at least one processor 810, at least one communication port 815, a main memory 820, a removable storage media 825, a read only memory 830, and a mass storage device 835.

Processor(s) 810 can be any known processor, such as, but not limited to, an Intel® Itanium® or Itanium 2® processor (s), or AMD® Opteron® or Athlon MP® processor(s), or Motorola® lines of processors. Communication port(s) 815 can be any of an RS-232 port for use with a modem based dialup connection, a 10/100 Ethernet port, or a Gigabit port using copper or fiber. Communication port(s) 815 may be chosen depending on a network such a Local Area Network (LAN), Wide Area Network (WAN), or any network to which the computer system 800 connects.

Main memory 820 can be Random Access Memory (RAM), or any other dynamic storage device(s) commonly known in the art. Read only memory 830 can be any static storage device(s) such as Programmable Read Only Memory (PROM) chips for storing static information such as instructions for processor 810.

Mass storage 835 can be used to store information and instructions. For example, hard disks such as the Adaptec® family of SCSI drives, an optical disc, an array of disks such as RAID, such as the Adaptec family of RAID drives, or any other mass storage devices may be used.

Bus 805 communicatively couples processor(s) 810 with the other memory, storage, and communication blocks. Bus 805 can be a PCI/PCI-X or SCSI based system bus depending on the storage devices used.

Removable storage media 825 can be any kind of external hard-drives, flash memory, floppy drives, (OMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only various embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "in some examples" and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead examples. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel methods of initiating financial transactions at an automated banking terminal. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
   receiving, at a mobile device, a machine-readable message from a kiosk including information identifying the kiosk, wherein the information identifying the kiosk includes a location of the kiosk;
   decoding, by the mobile device, the information identifying the kiosk from the machine-readable message;
   receiving, at the mobile device from a user, authentication information for a user to initiate a transaction relating to money;
   verifying, by the mobile device, the authentication information; and
   transmitting, by the mobile device to a remote server,
      an identification of the user authenticated by the mobile device and
      the information identifying the kiosk including the location of the kiosk decoded from the machine-readable message,
   wherein the user inputs transaction request information into the kiosk within a determined timeframe within a single session of transmitting the identification of the user and the information identifying the kiosk to the remote server,
   wherein the transaction is continued to completion at the kiosk,
   wherein the remote server evaluates the transaction request information and authorizes the transaction.

2. The method of claim 1, wherein the remote server transmits account information or transaction information to the kiosk using the information identifying the kiosk.

3. The method of claim 2, wherein the machine-readable message is displayed on a display screen of the kiosk, and wherein the method further comprises storing the account information or the transaction information in the mobile device.

4. The method of claim 1, wherein the machine-readable message further includes information identifying the remote server, and wherein the method further comprises decoding, by the mobile device, the information identifying the remote server from the machine-readable message.

5. The method of claim 1, further comprising receiving authorization to complete the transaction when the location of the kiosk is within a predetermined distance of a location of the mobile device.

6. The method of claim 1, further comprising: receiving, at the mobile device from the kiosk, an electronic receipt.

7. The method of claim 1, wherein the mobile device optically receives the machine-readable message from the kiosk, wherein a software application on the mobile device decodes the information identifying the kiosk, wherein the software application controls an optical device that captures the machine-readable message.

8. A non-transitory, computer-readable medium having computer-readable instructions that, when executed by one or more computer processors, direct the one or more computer processors to:
   receive, at a mobile device, a machine-readable message from a kiosk including information identifying the kiosk, wherein the information identifying the kiosk includes a location of the kiosk;
   decode, by the mobile device from a user, the information identifying the kiosk including the location of the kiosk from the machine-readable message;
   receive, at the mobile device, authentication information for the user to initiate a transaction relating to money;
   verify, by the mobile device, the authentication information; and
   transmit, by the mobile device to a remote server, an identification of the user authenticated by the mobile device and the information identifying the kiosk decoded from the machine-readable message,
      wherein the user inputs transaction request information into the kiosk within a determined timeframe within a single session of transmitting the identification of the user and the information identifying the kiosk to the remote server,
      wherein the transaction is continued to completion after the user is authenticated at the kiosk,
      wherein the remote server evaluates the transaction request information and authorizes the transaction.

9. The non-transitory, computer-readable medium of claim 8, wherein the remote server transmits account information or transaction information to the kiosk using the information identifying the kiosk.

10. The non-transitory, computer-readable medium of claim 9, wherein the machine-readable message is displayed on a display screen of the kiosk, and wherein the computer-readable instructions further comprise instructions that, when executed by the one or more computer processors, direct the one or more computer processors to store the account information or the transaction information in the mobile device.

11. The non-transitory, computer-readable medium of claim 8, wherein the machine-readable message further includes information identifying the remote server, and wherein the computer-readable instructions further comprise instructions that, when executed by the one or more computer processors, direct the one or more computer processors to decode, by the mobile device, the information identifying the remote server from the machine-readable message.

12. The non-transitory, computer-readable medium of claim 8, wherein the computer-readable instructions further comprise instructions that, when executed by the one or more computer processors, direct the one or more computer processors to: receive, at the mobile device from the kiosk, an electronic receipt.

13. A system comprising:
   a memory containing machine-readable instructions; and
   a computer processor in communication with the memory and configured to execute the machine-readable instructions to:
      receive a machine-readable message from a kiosk including information identifying the kiosk, wherein the information identifying the kiosk includes a location of the kiosk;
      decode, by a mobile device, the information identifying the kiosk including the location of the kiosk from the machine-readable message;
      receive, by the mobile device from a user, authentication information for the user to initiate a transaction relating to money;
      verify the authentication information; and
      transmit, by the mobile device to a remote server, an identification of the user authenticated by the mobile device and the information identifying the kiosk decoded from the machine-readable message,
   wherein the user inputs transaction request information into the kiosk within a determined timeframe within a single session of transmitting the identification of the user and the information identifying the kiosk to the remote server,
   wherein the transaction is continued to completion at the kiosk,
   wherein the remote server evaluates the transaction request information and authorizes the transaction.

14. The system of claim 13, wherein the remote server transmits account information or transaction information to the kiosk using the information identifying the kiosk.

15. The system of claim 13, wherein the machine-readable message further includes information identifying the remote server, and wherein the computer processor that is configured to execute the machine-readable instructions is further configured to execute machine-readable instructions to decode the information identifying the remote server from the machine-readable message.

16. The system of claim 13, wherein the computer processor that is configured to execute the machine-readable instructions is further configured to execute machine-readable instructions to: receive, at the mobile device from the kiosk, an electronic receipt.

* * * * *